US 9,979,877 B2

(12) United States Patent
Shibagami

(10) Patent No.: US 9,979,877 B2
(45) Date of Patent: May 22, 2018

(54) IMAGE CAPTURING APPARATUS, CONTROL METHOD OF THE SAME, AND STORAGE MEDIUM

(71) Applicant: CANON KABUSHIKI KAISHA, Tokyo (JP)

(72) Inventor: Genjiro Shibagami, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 15/428,378

(22) Filed: Feb. 9, 2017

(65) Prior Publication Data
US 2017/0244887 A1 Aug. 24, 2017

(30) Foreign Application Priority Data
Feb. 19, 2016 (JP) .................. 2016-030266

(51) Int. Cl.
H04N 5/232 (2006.01)
G03B 13/00 (2006.01)
G02B 7/10 (2006.01)
G02B 7/36 (2006.01)

(52) U.S. Cl.
CPC ......... H04N 5/23212 (2013.01); G02B 7/102 (2013.01); G02B 7/36 (2013.01)

(58) Field of Classification Search
CPC ........ H04N 5/23212; G03B 3/00; G03B 3/02; G03B 13/32; G03B 13/36; G03B 13/30; G02B 7/09; G02B 7/36; G02B 7/365; G02B 7/38; G02B 7/285
USPC .................................................. 348/345–353
See application file for complete search history.

(56) References Cited

U.S. PATENT DOCUMENTS

| 2005/0280735 A1* | 12/2005 | Nakahara | H04N 5/23212 348/345 |
| 2008/0252773 A1* | 10/2008 | Oishi | G03B 13/32 348/347 |
| 2011/0305446 A1* | 12/2011 | Itoh | G03B 13/36 396/95 |
| 2013/0010179 A1* | 1/2013 | Takahara | G02B 7/36 348/353 |
| 2014/0218595 A1* | 8/2014 | Kanda | H04N 5/23212 348/353 |

FOREIGN PATENT DOCUMENTS

JP 2906238 B 6/1999
JP 2007-206433 A 8/2007

* cited by examiner

Primary Examiner — Kelly L Jerabek
(74) Attorney, Agent, or Firm — Cowan, Liebowitz & Latman, P.C.

(57) ABSTRACT

An image capturing apparatus is provided with: a detection unit configured to detect in-focus positions; a storage unit in which focus cam data is stored that indicates a relationship between an object distance and a focus lens position; a calculation unit configured to calculate object distances at the in-focus positions, based on focus lens positions at the in-focus positions and the focus cam data; an estimation unit configured to estimate an object distance in next in-focus position detection; and a determination unit configured to determine a predetermined range in which the focus lens is moved in the next in-focus position detection, based on an estimated value for the object distance in the next in-focus position detection that was estimated by the estimation unit.

10 Claims, 12 Drawing Sheets

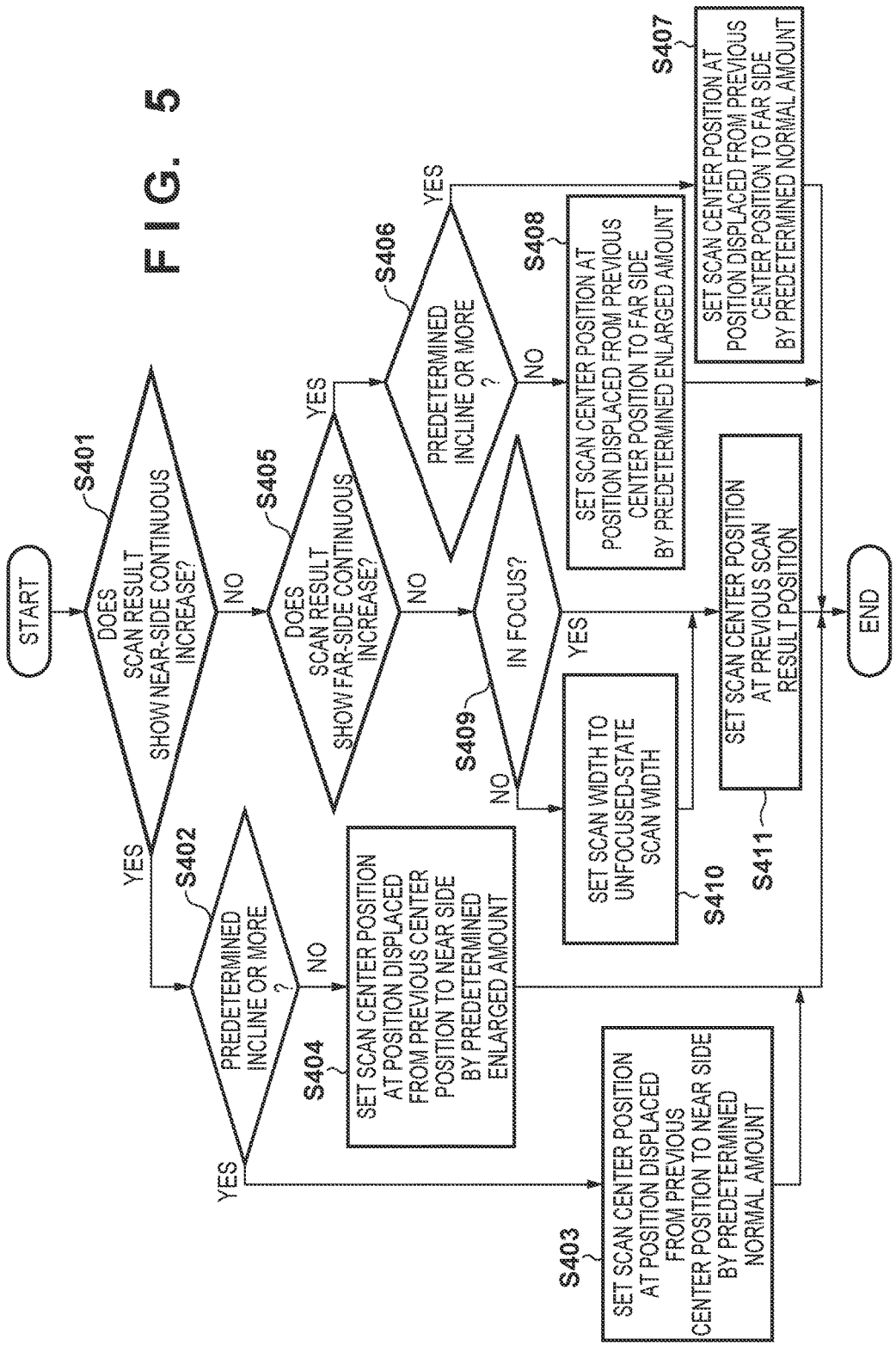

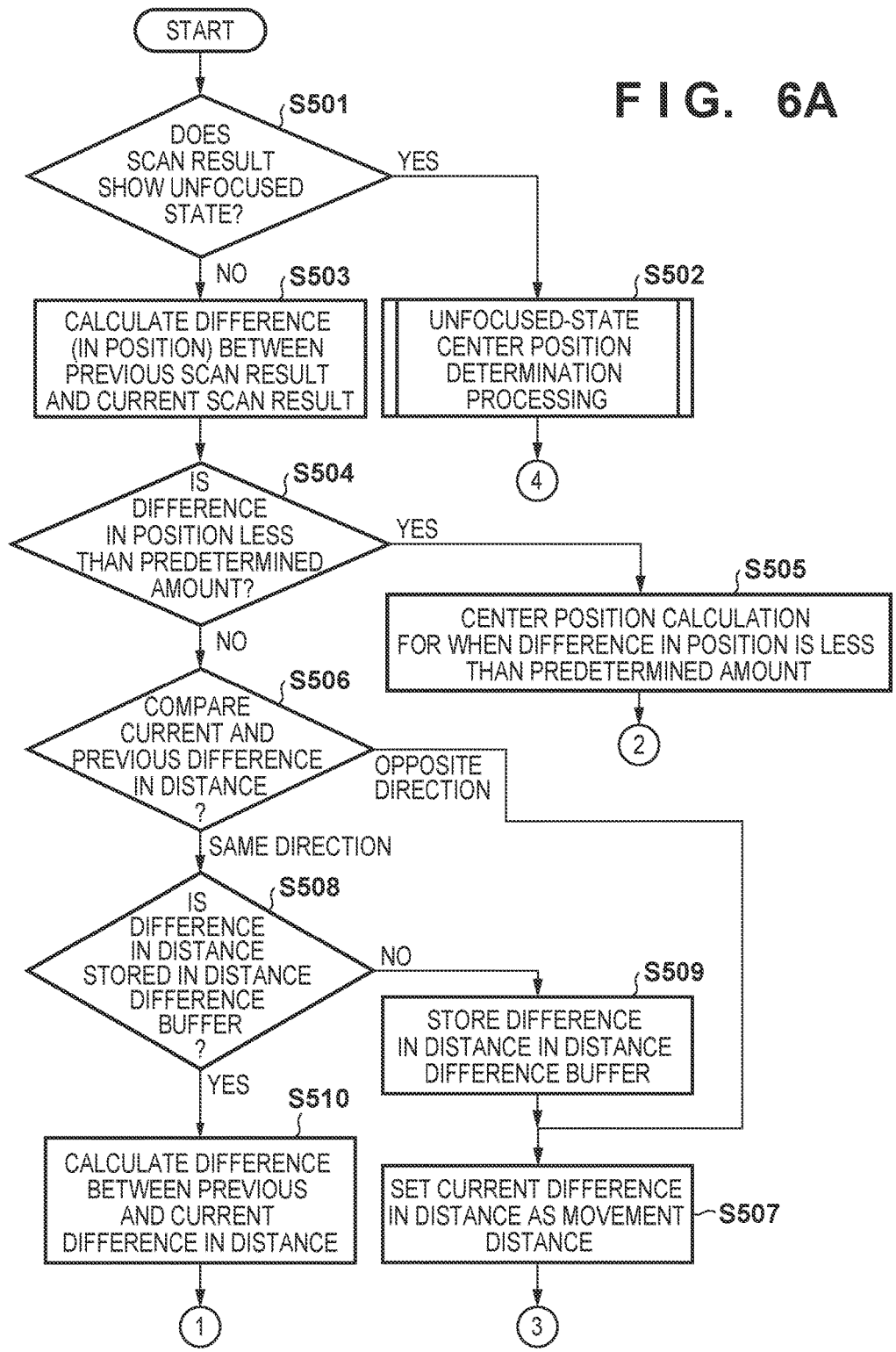

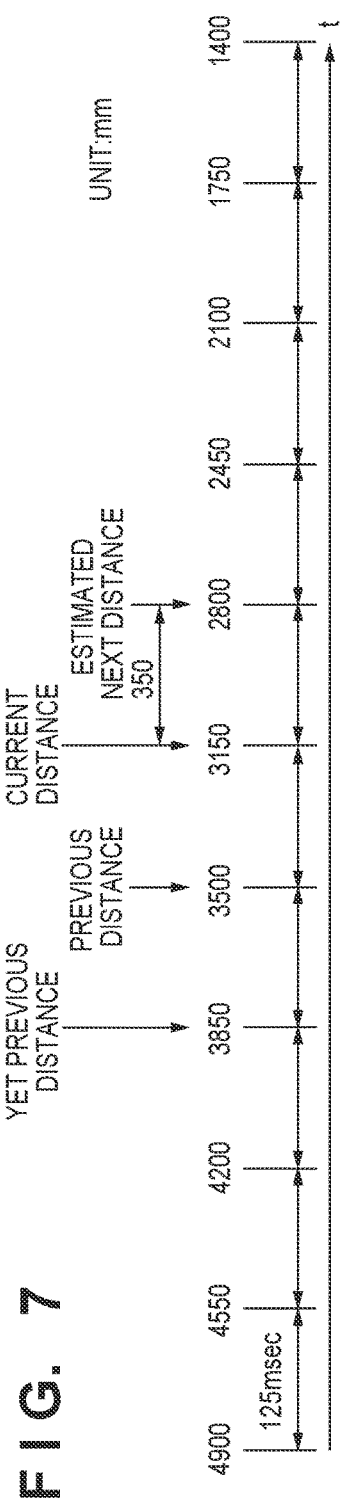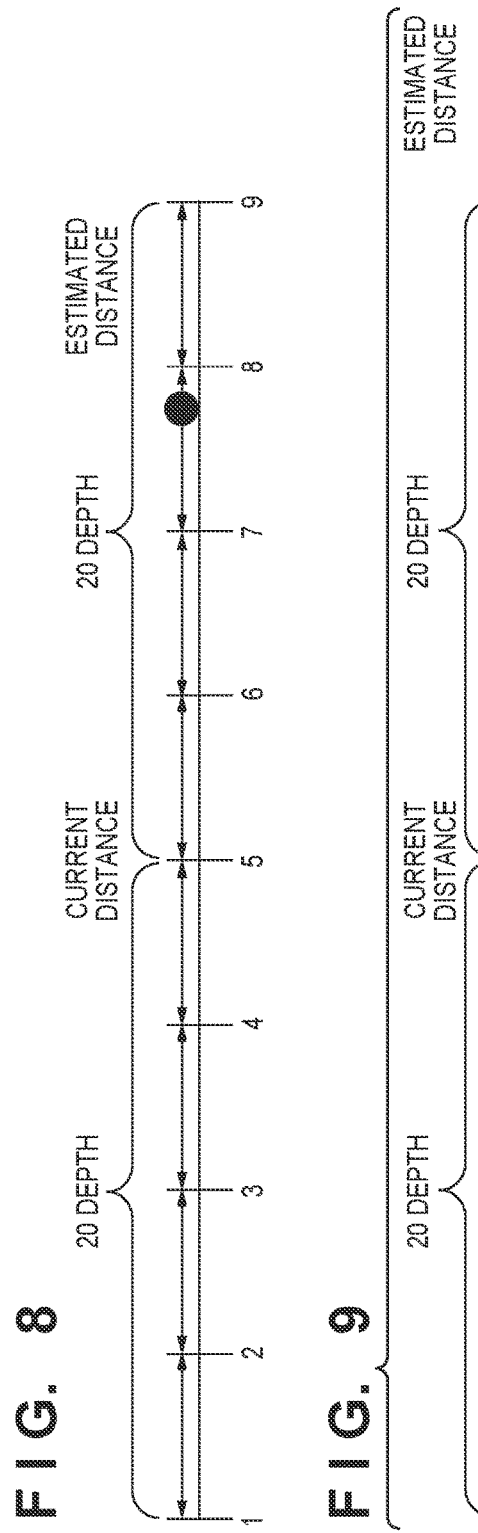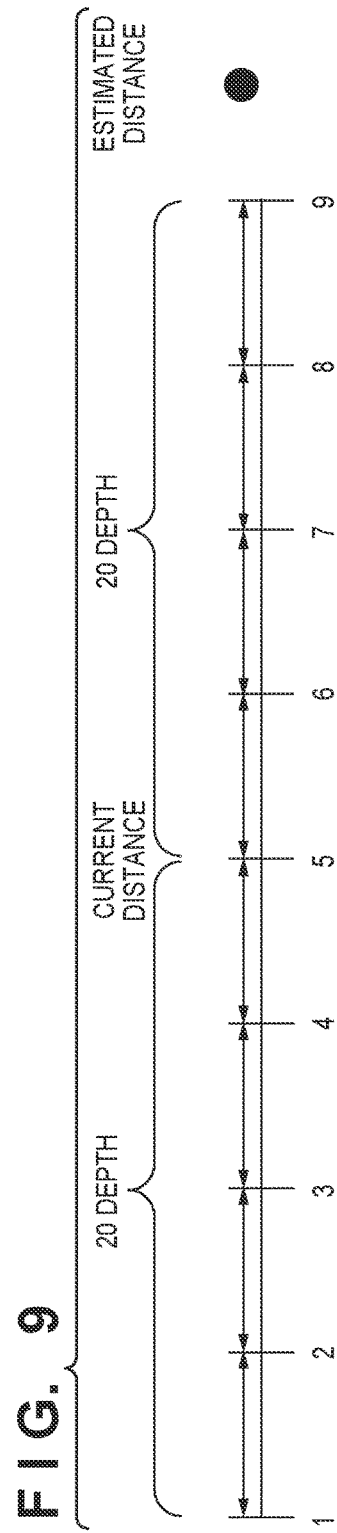

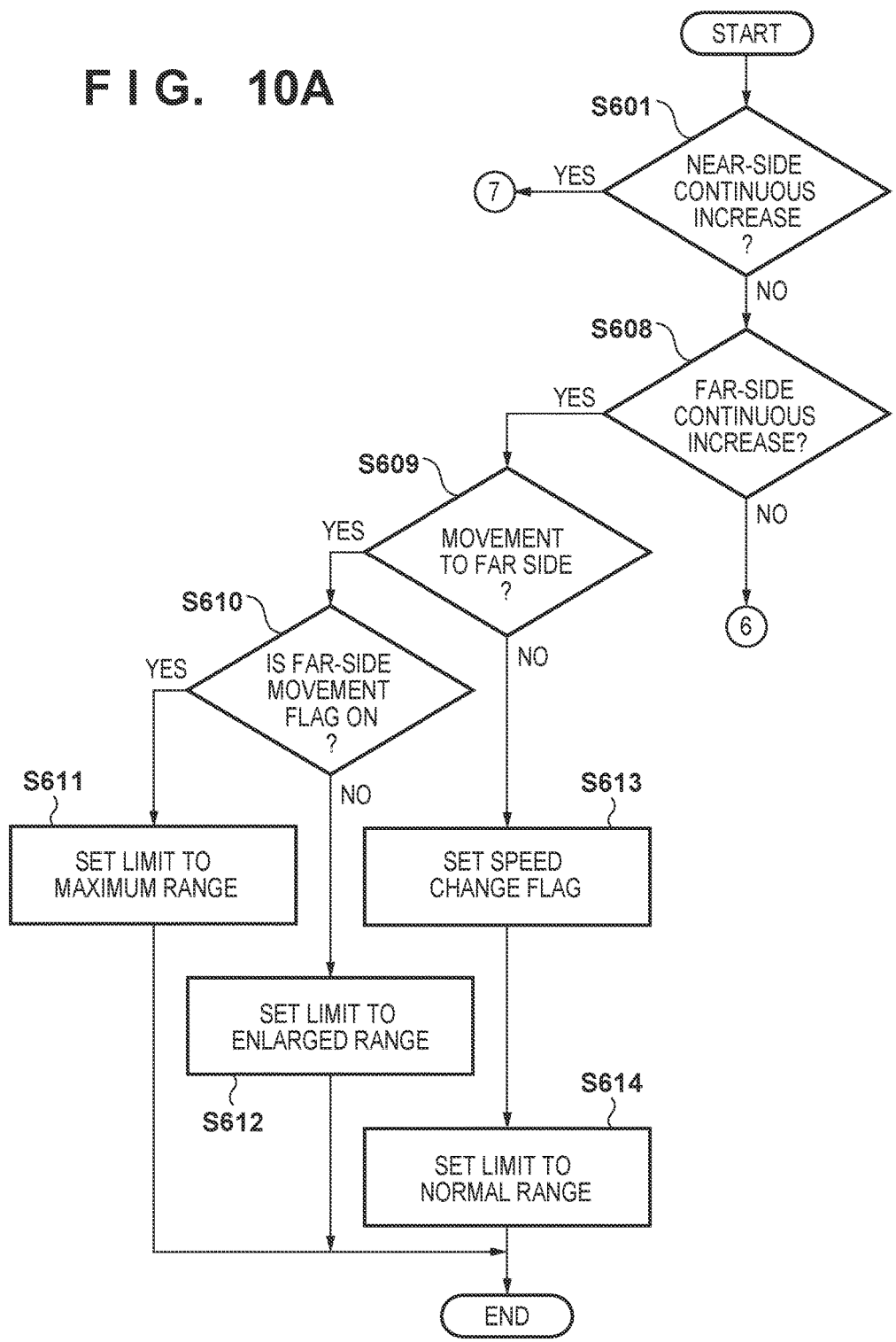
F I G. 10A

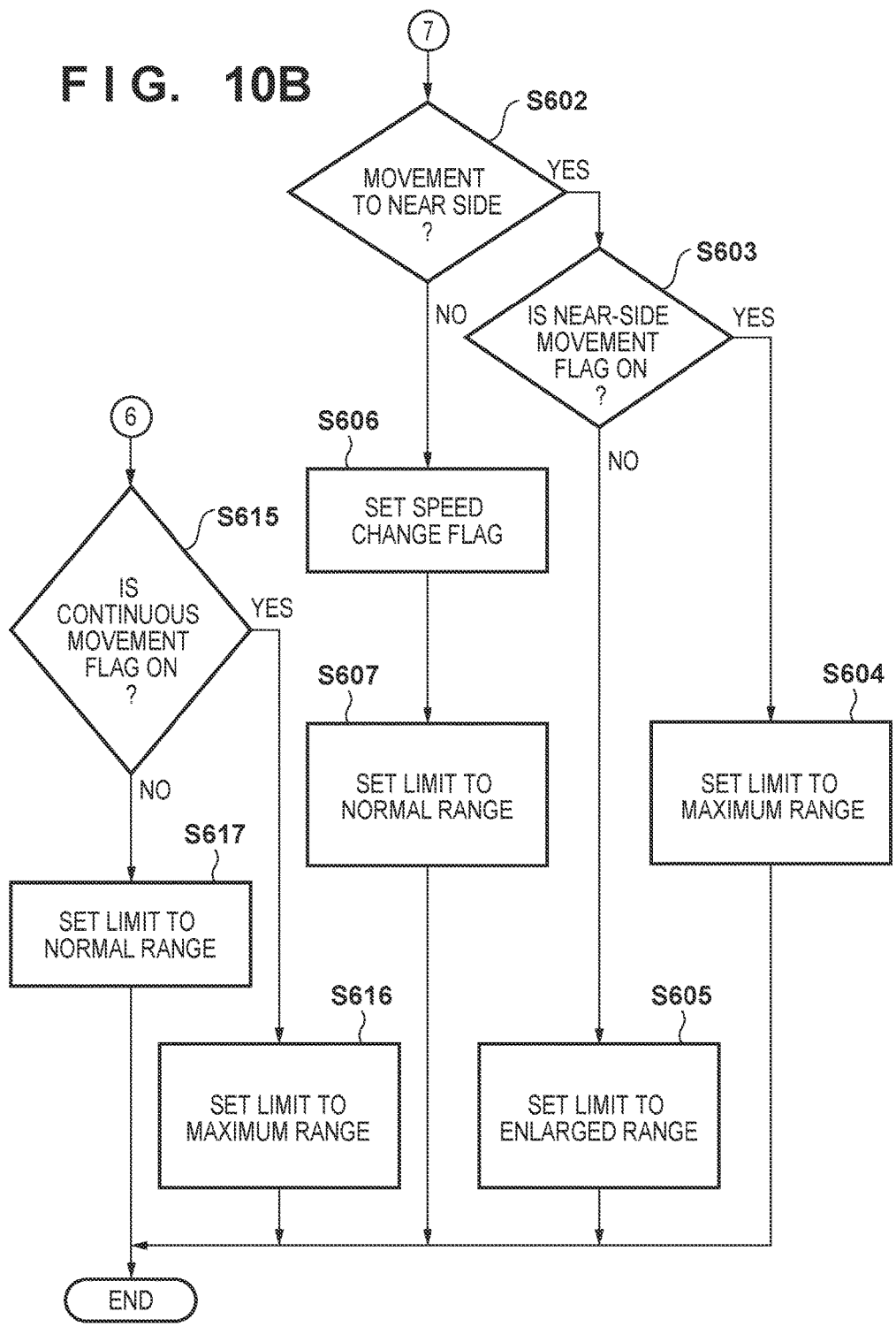

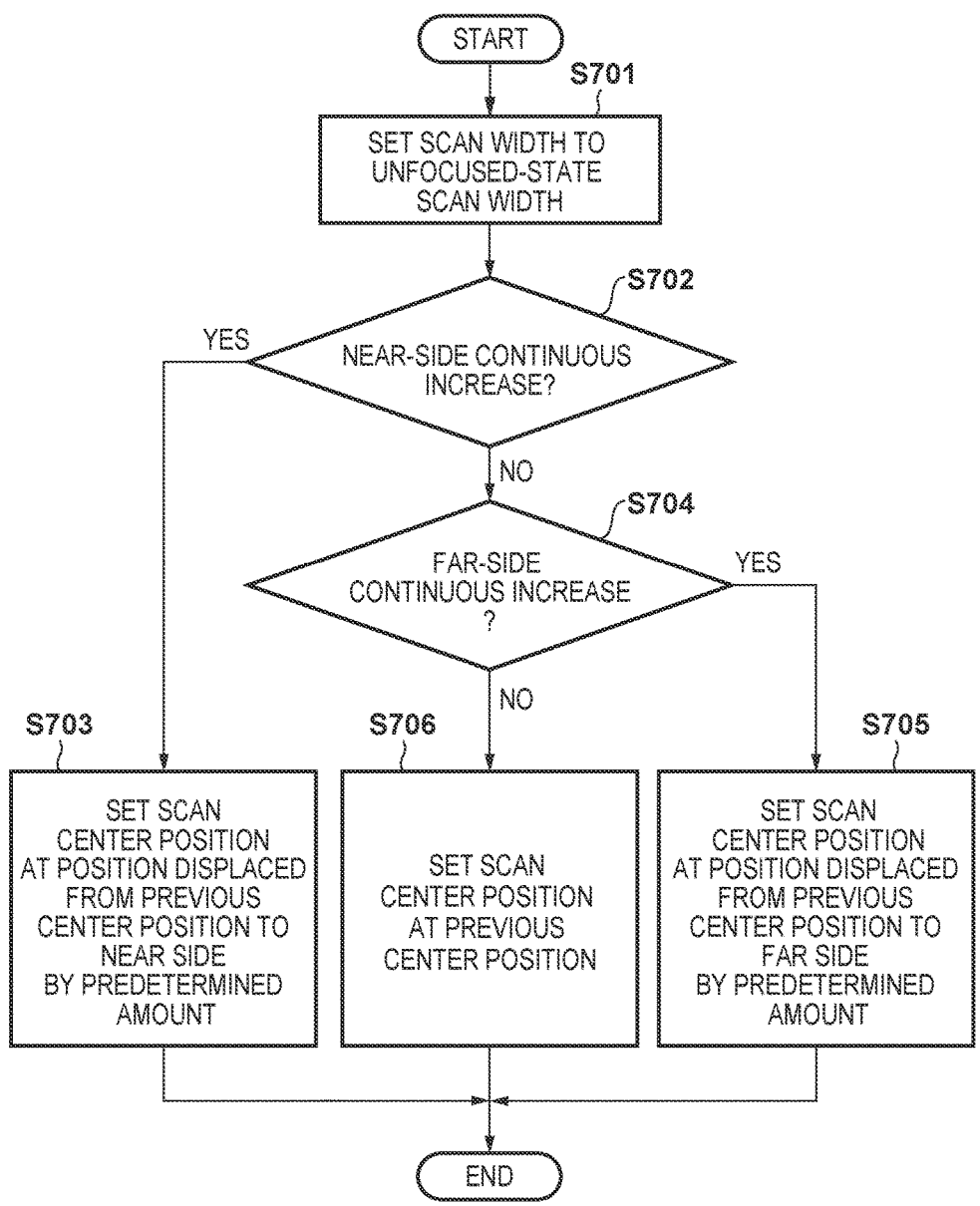

IMAGE CAPTURING APPARATUS, CONTROL METHOD OF THE SAME, AND STORAGE MEDIUM

BACKGROUND OF THE INVENTION

Field of the Invention

The present invention relates to a technique for focusing on a moving object with an image capturing apparatus.

Description of the Related Art

Conventionally, a technique used in image capturing apparatuses of performing autofocus during continuous shooting to continuously focus on an object (hereinafter, referred to as "servo continuous shooting") is known.

Japanese Patent Laid-Open No. 2007-206433 discloses, as a technique for performing autofocus during continuous shooting, a method for continuously focusing on an object by repeating scanning using a previous in-focus position as a center. "Scanning" refers to an operation of moving a focus lens in a predetermined range to acquire an evaluation value (hereinafter, referred to as "AF evaluation value") that is based on the magnitude of a contrast, and searching for an in-focus position. However, in this method, a near-side distance at which a moving object can be focused on is limited. This is because, as the object approaches the image capturing apparatus, even a slight change in the object distance will largely change the in-focus position. In order to bring the limit distance closer to the image capturing apparatus, it is necessary to estimate the scan center position.

In order to solve this problem, Japanese Patent No. 2906238 discloses a method for moving a focus lens, in which information relating to acceleration, on an image plane, of a moving object is calculated, a movement amount, on the image plane, of the moving object is calculated taking into consideration the information, and a defocus amount is corrected based on the movement amount.

However, in the method disclosed in Japanese Patent Laid-Open No. 2007-206433, calculation is performed based on a previous in-focus position of the focus lens that is stored in a storage means, and thus, even when an object is moving at a constant speed, the change in the focus lens position at which the object is in focus is not linear. Accordingly, complex calculation is needed to estimate a focus lens position at which the object is in focus.

Furthermore, in the method disclosed in Japanese patent No. 2906238, since a defocus amount is corrected based on information relating to acceleration on an image plane, it is necessary to calculate the acceleration, and thus the calculation is troublesome. Furthermore, since a change on the image plane is not linear, the calculation thereof is also complex.

SUMMARY OF THE INVENTION

The present invention was made in view of the above-described problems, and provides an image capturing apparatus that can capture an image in which an object is focused on without performing complex calculation, even if the object is moving and is located at a short distance.

According to a first aspect of the present invention, there is provided an image capturing apparatus comprising: a detection unit configured to detect in-focus positions by moving a focus lens of an imaging optical system along an optical axis in a predetermined range to acquire a focus evaluation value that is based on an image contrast; a storage unit in which focus cam data is stored that indicates a relationship between an object distance and a focus lens position that corresponds to the object distance; a calculation unit configured to calculate object distances at the in-focus positions that were obtained in the in-focus position detection continuously performed by the detection unit, based on focus lens positions at the in-focus positions and the focus cam data; an estimation unit configured to estimate an object distance in next in-focus position detection, based on a difference between the object distances at the in-focus positions that were calculated by the calculation unit; and a determination unit configured to determine a predetermined range in which the focus lens is moved in the next in-focus position detection, based on an estimated value for the object distance in the next in-focus position detection that was estimated by the estimation unit.

According to a second aspect of the present invention, there is provided a method for controlling an image capturing apparatus that is provided with a storage unit in which focus cam data is stored that indicates a relationship between an object distance and a focus lens position that corresponds to the object distance, the method comprising: detecting in-focus positions by moving a focus lens along an optical axis in a predetermined range to acquire a focus evaluation value that is based on an image contrast; calculating object distances at the in-focus positions that were obtained in the in-focus position detection continuously performed in the detecting, based on focus lens positions at the in-focus positions and the focus cam data; estimating an object distance in next in-focus position detection, based on a difference between the object distances at the in-focus positions that were calculated in the calculating; and determining a predetermined range in which the focus lens is moved in the next in-focus position detection, based on an estimated value for the object distance in the next in-focus position detection that was estimated in the estimating.

Further features of the present invention will become apparent from the following description of exemplary embodiments with reference to the attached drawings.

BRIEF DESCRIPTION OF THE DRAWINGS

FIG. 5 is a flowchart illustrating a procedure of first center position determination processing in step S303 of FIG. 3.

FIGS. 6A-6C are flowcharts illustrating a procedure of second or subsequent center position determination processing in step S304 of FIG. 3.

FIG. 7 illustrates a method for determining a scan center position using a movement distance.

FIG. 8 illustrates a case where an estimated scan center position does not exceed a limit range.

FIG. 9 illustrates a case where an estimated scan center position exceeds the limit range.

FIGS. 10A and 10B are flowcharts illustrating a procedure of limit-range setting processing in step S520 of FIG. 6C.

FIG. 11 is a flowchart illustrating a procedure of unfocused-state center position determination processing in step S502 of FIG. 6A.

DESCRIPTION OF THE EMBODIMENTS

Figure 1:
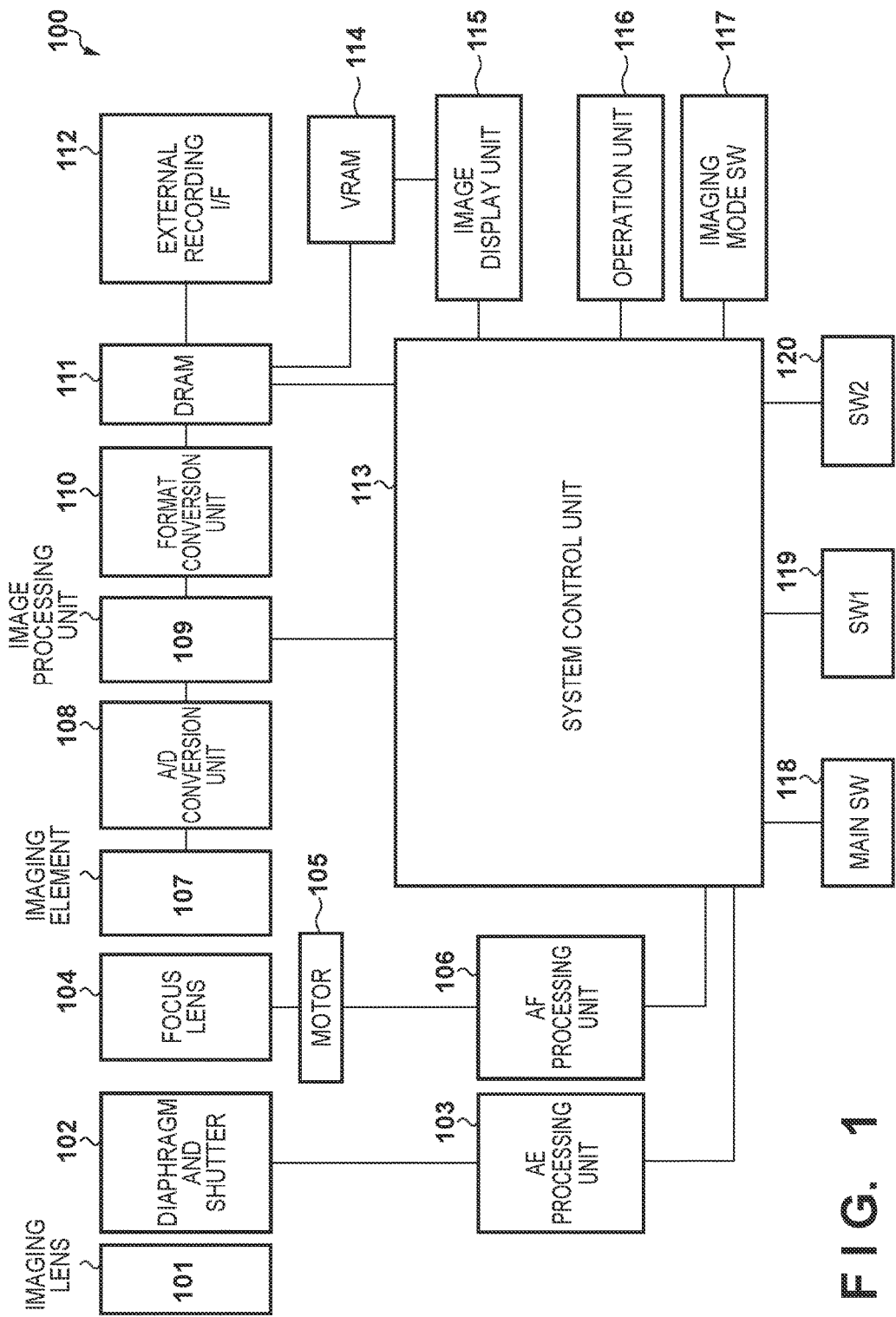
FIG. 1 is a block diagram illustrating a configuration of a camera that is an embodiment of an image capturing apparatus of the present invention.

Hereinafter, an embodiment of the present invention will be described in detail with reference to the accompanying drawings. FIG. 1 is a block diagram schematically illustrating a configuration of a camera 100, which is an embodiment of an image capturing apparatus of the present invention.

In FIG. 1, the camera 100 is provided with an imaging lens (imaging optical system) 101, a shutter 102, an AE processing unit 103, a focus lens 104, a motor 105, an AF processing unit 106, an imaging element 107, an A/D conversion unit 108, an image processing unit 109, and a format conversion unit 110. The camera 100 is further provided with a DRAM 111, an external recording I/F 112, a system control unit 113, a VRAM 114, an image display unit 115, and an operation unit 116. The system control unit 113 is connected to the AE processing unit 103, the AF processing unit 106, the image processing unit 109, the DRAM 111, the image display unit 115, and the operation unit 116. The shutter 102 is connected to the AE processing unit 103, and the motor 105 is connected to the focus lens 104 and the AF processing unit 106. The imaging element 107 is connected to the A/D conversion unit 108, the A/D conversion unit 108 is connected to the image processing unit 109, and the image processing unit 109 is connected to the format conversion unit 110. The DRAM 111 is connected to the format conversion unit 110, the external recording I/F 112, and the VRAM 114, and the VRAM 114 is connected to the image display unit 115.

The DRAM stores focus cam data. "Focus cam data" refers to data regarding focus lens positions of focal lengths at which an object is in focus at respective object distances. In other words, "focus cam data" refers to data that indicates the relationship between focus lens positions and object distances. The use of the focus cam data enables, when an object is to be focused on with autofocus, calculation of the distance at which the object is to be focused on based on the focus lens position.

The imaging lens 101 includes a zoom mechanism, and the shutter 102 has a diaphragm function. The AE processing unit 103 controls the shutter 102 to regulate the amount of light that is to pass through the imaging lens 101. The focus lens 104 can move in a direction along an optical axis as a result of being driven by the motor 105. The AF processing unit 106 controls the motor 105 to move the position of the focus lens 104. The camera 100 moves the position of the focus lens 104 to adjust the focus of an object. Furthermore, the AF processing unit 106 analyses an image data contrast based on image data acquired from the system control unit 113 and the like, and calculates, based on the result of the analysis, an AF evaluation value (focus evaluation value) that indicates the magnitude of the image data contrast. A high AF evaluation value indicates a high image data contrast, thus indicating a state in which the object is more in focus, while a low AF evaluation value indicates a low image data contrast, thus indicating a state in which the focus is blurred. The imaging element 107 receives light that has transmitted through the focus lens 104, and photoelectrically converts the received light into an electric analog signal.

The A/D conversion unit 108 converts the analog signal photoelectrically converted by the imaging element 107 into a digital signal. The image processing unit 109 generates image data based on the digital signal converted by the A/D conversion unit 108, and uses edge components contained in the generated image data to determine a region or detect object regions. The format conversion unit 110 converts the image data generated by the image processing unit 109 into a format in which the image data can be read by the AF processing unit 106 and the like. The DRAM 111 is a high-speed embedded memory, and the external recording I/F 112 performs data communication with various types of external recording media such as a memory card.

The system control unit 113 is provided with a CPU and a storage unit in which various programs executable by the CPU are stored. As a result of the CPU executing the various programs stored in the storage unit, the system control unit 113 performs overall control of the constituent components that are connected to the system control unit 113. The VRAM 114 stores display data that is needed for various types of display on the image display unit 115. The image display unit 115 displays various screens, such as for example screens for displaying a moving image during imaging and various settings, based on the display data stored in the VRAM 114. The operation unit 116 is provided with various operation buttons to configure various settings of the camera 100 and operate various imaging processes. Furthermore, a main switch 118, which turns the main power supply of the camera 100 ON and OFF, and a switch SW1 (119) and a switch SW2 (120), which are respectively turned ON by a release button being pressed halfway down and all the way down, are connected to the system control unit 113.

Figure 2:
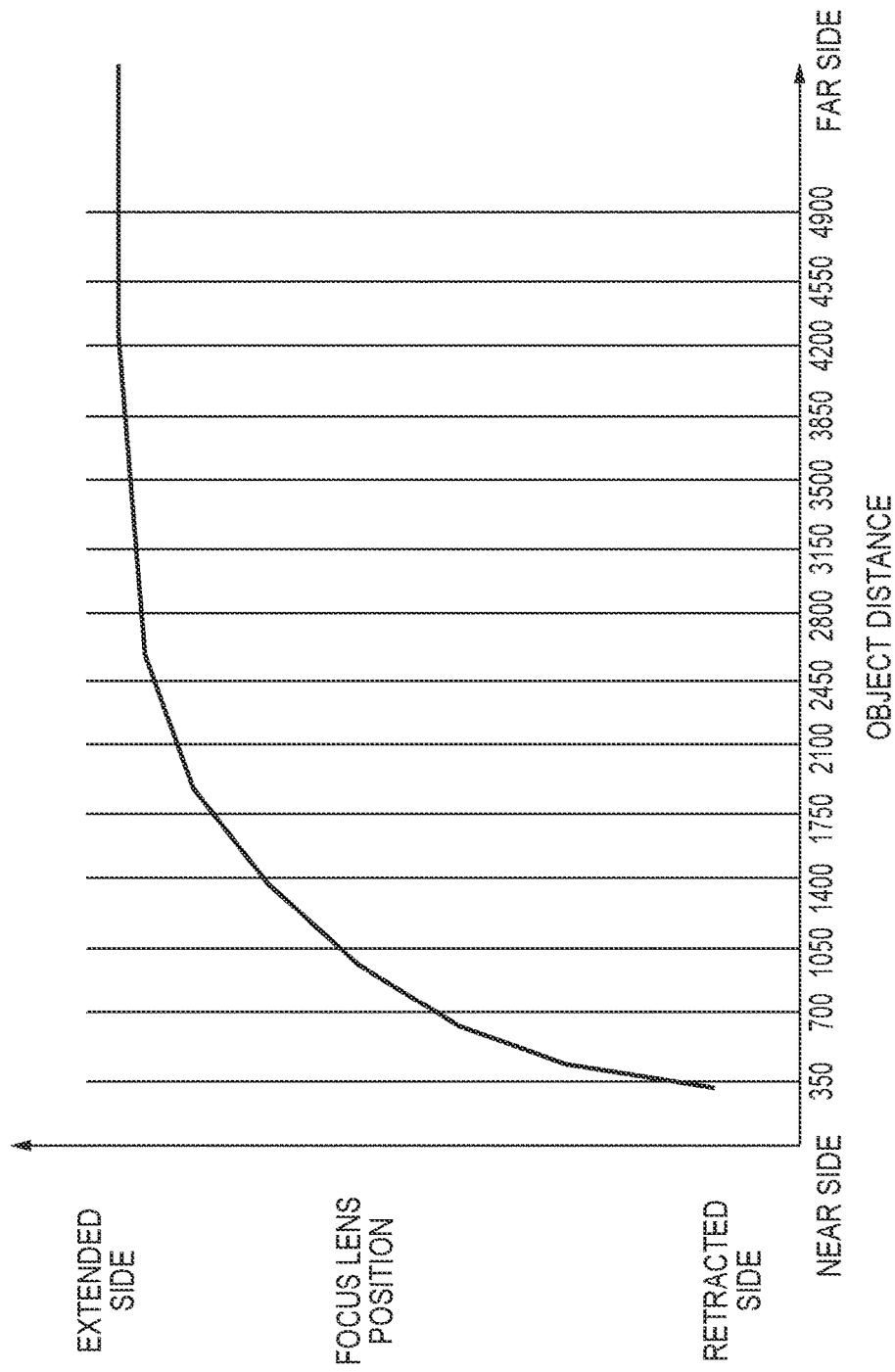
FIG. 2 is a diagram illustrating cam data that is stored in the camera.

FIG. 2 shows focus cam data. The horizontal axis indicates the object distance, and the vertical axis indicates the focus lens position. It is here assumed that the horizontal axis is scaled at 350 mm intervals. Assuming that the speed of an object is 10 km/hour and a time interval of continuous shooting is 125 msec, 350 mm is a distance that the object moves in a time interval of continuous shooting.

Figure 3:
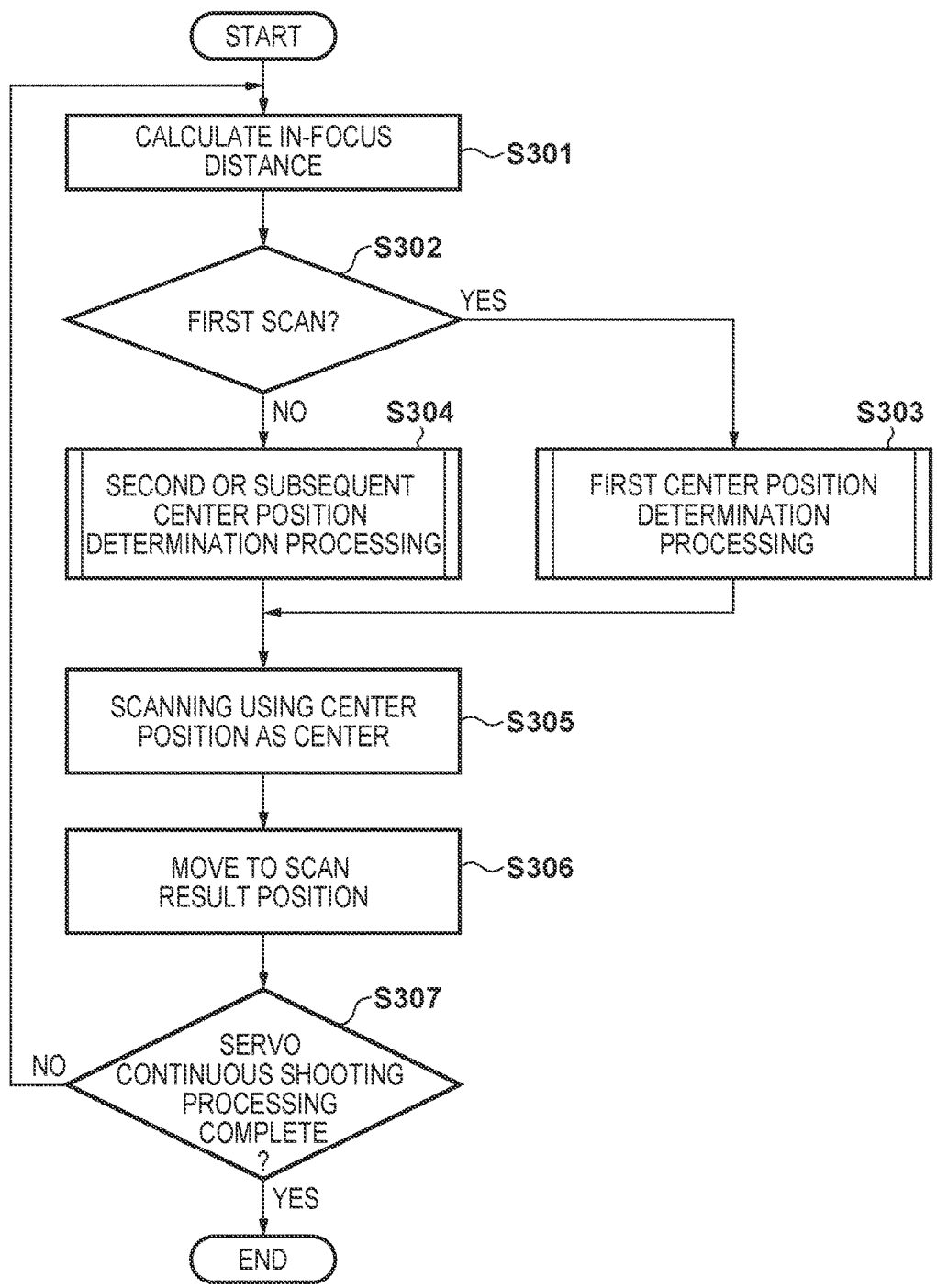
FIG. 3 is a flowchart illustrating a procedure of scanning during servo continuous shooting.

FIG. 3 is a flowchart illustrating a procedure of object following processing in servo continuous shooting that is executed by the camera 100 of FIG. 1.

Figure 4:
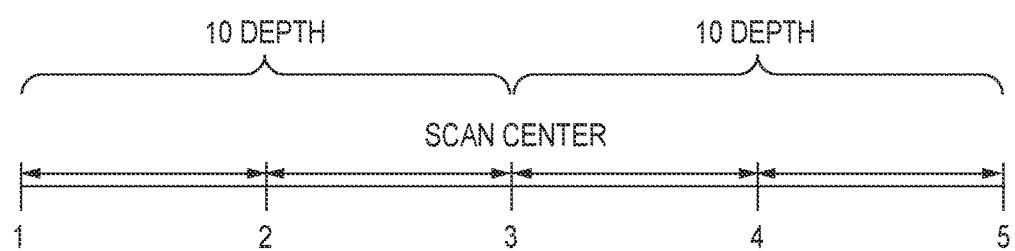
FIG. 4 is a diagram illustrating a region to be scanned by the camera.

First, in step S301, an in-focus distance is calculated. In order to obtain an in-focus distance, scanning is first performed with the focus lens 104 in a range of a depth of ±10 from the scan center position in respective directions along the optical axis, as shown in FIG. 4, and the focus lens position at which an object is focused on is obtained. "Scanning" refers to an operation of moving the focus lens in a predetermined range to acquire an evaluation value (hereinafter, referred to as "AF evaluation value") that is based on the magnitude of a contrast, and searching for the in-focus position. The object distance (in-focus distance) that corresponds to the focus lens position that serves as the in-focus position is obtained through calculation using the focus cam data.

Then, in step S302, it is determined whether the scanning in which the in-focus position was obtained is a first scan or a second or subsequent scan, after the start of servo continuous shooting. If it is determined that the scanning is the first scan, in step S303, the next scan center position determination processing (processing for determining a next scan center position) in the first scan is performed. This processing will be described later with reference to FIG. 5. If it is determined that the scanning is the second or subsequent scan, in step S304, the next scan center position determination processing in the second or subsequent scan is performed. This processing will be described later with reference to FIGS. 6A-6C.

Then, in step S305, scanning is performed with the focus lens 104 using the scan center position determined in step S303 or S304 as the center. Then, in step S306, the focus lens is moved to the in-focus position that was obtained as a result of the scanning. The scanning and the moving of the focus lens to the in-focus position are performed prior to each shot in the servo continuous shooting. Then, in step S307, whether or not the servo continuous shooting processing is complete is determined. If the servo continuous shooting processing is complete, the procedure ends. If the servo continuous shooting processing is not complete, the procedure returns to step S301, and the object following processing in the servo continuous shooting is continued.

FIG. 5 is a flowchart illustrating a procedure of the first scan center position determination processing in step S303 of FIG. 3.

First, in step S401, whether or not the scan result shows a near-side continuous increase is determined. "Near-side continuous increase" refers to a state in which the AF evaluation value obtained as a result of the scanning is likely to continue to increase at a near side end of a scan range and has not changed to decrease. In this case, it is conceivable that the object is on the near side relative to the scanned range.

If it is determined that the scan result shows a near-side continuous increase, then in step S402, whether or not an ascending curve of the AF evaluation values has a predetermined incline or more is determined. If the AF evaluation value is likely to increase in a direction in which focusing is performed at the near side, and a difference between the evaluation value at the near side end of the scan range and the previous evaluation value is large, an object is highly likely to be present in the vicinity of the scan region. On the other hand, if the difference is small, an object is unlikely to be present in the vicinity of the scan region.

If, in step S402, it is determined that the ascending curve has a predetermined incline or more, then in step S403, the next scan center position (an estimated value for the object distance at the time of detecting the next in-focus position) is set at a position that is displaced from the previous scan center position to the near side by a predetermined normal amount. In the present embodiment, this predetermined normal amount is set to a depth of 20. If, in step S402, it is determined that the ascending curve does not have the predetermined incline or more, then in step S404, the next scan center position is set at a position that is displaced from the previous scan center position to the near side by a predetermined enlarged amount. In the present embodiment, the predetermined enlarged amount is set to a depth of 30.

Then, in step S405, whether or not the scan result shows a far-side continuous increase is determined. "Far-side continuous increase" refers to a state in which the AF evaluation value obtained as a result of the scanning is likely to continue to increase at a far side end of the scan range, and has not changed to decrease. In this case, it is conceivable that the object is on the far side relative to the scanned range.

If it is determined that the scan result shows a far-side continuous increase, then in step S406, whether or not an ascending curve (rising curve) of the AF evaluation values has a predetermined incline or more is determined. If the AF evaluation value is likely to increase in a direction in which focusing is performed at the far side, and a difference between the evaluation value at the far side end of the scan range, and a previous evaluation value is large, an object is highly likely to be present in the vicinity of the scan region. On the other hand, if the difference is small, an object is unlikely to be present in the vicinity of the scan region.

If, in step S406, it is determined that the ascending curve has a predetermined incline or more, then in step S407, the next scan center position is set at a position that is displaced from the previous scan center position to the far side by a predetermined normal amount. In the present embodiment, this predetermined normal amount is set to a depth of 20. Furthermore, if it is determined that the ascending curve does not have the predetermined incline or more, in step S408, the next scan center position is set at a position that is displaced from the previous scan center position to the far side by a predetermined enlarged amount. In the present embodiment, the predetermined enlarged amount is set to a depth of 30.

If it is determined that the scan result shows neither a near-side continuous increase nor a far-side continuous increase, in step S409, whether or not the object is in focus is determined. If it is determined that object is not in focus, that is, the AF evaluation value is low and is unlikely to increase, in step S410, the scan width is set to an unfocused-state scan width. This refers to an interval between focus lens positions at which AF evaluation values are sampled. In the present embodiment, it is assumed that the normal scan width is set to a depth of 5, and the unfocused-state scan width is set to a depth of 10. After the scan width has been set to the unfocused-state scan width, in step S411, the scan center position is set to the previous scan result position, and the procedure ends. If, in step S409, it is determined that object is in focus, in step S411, the scan center position is set to the previous scan result position, and the procedure ends.

Figure 6B:
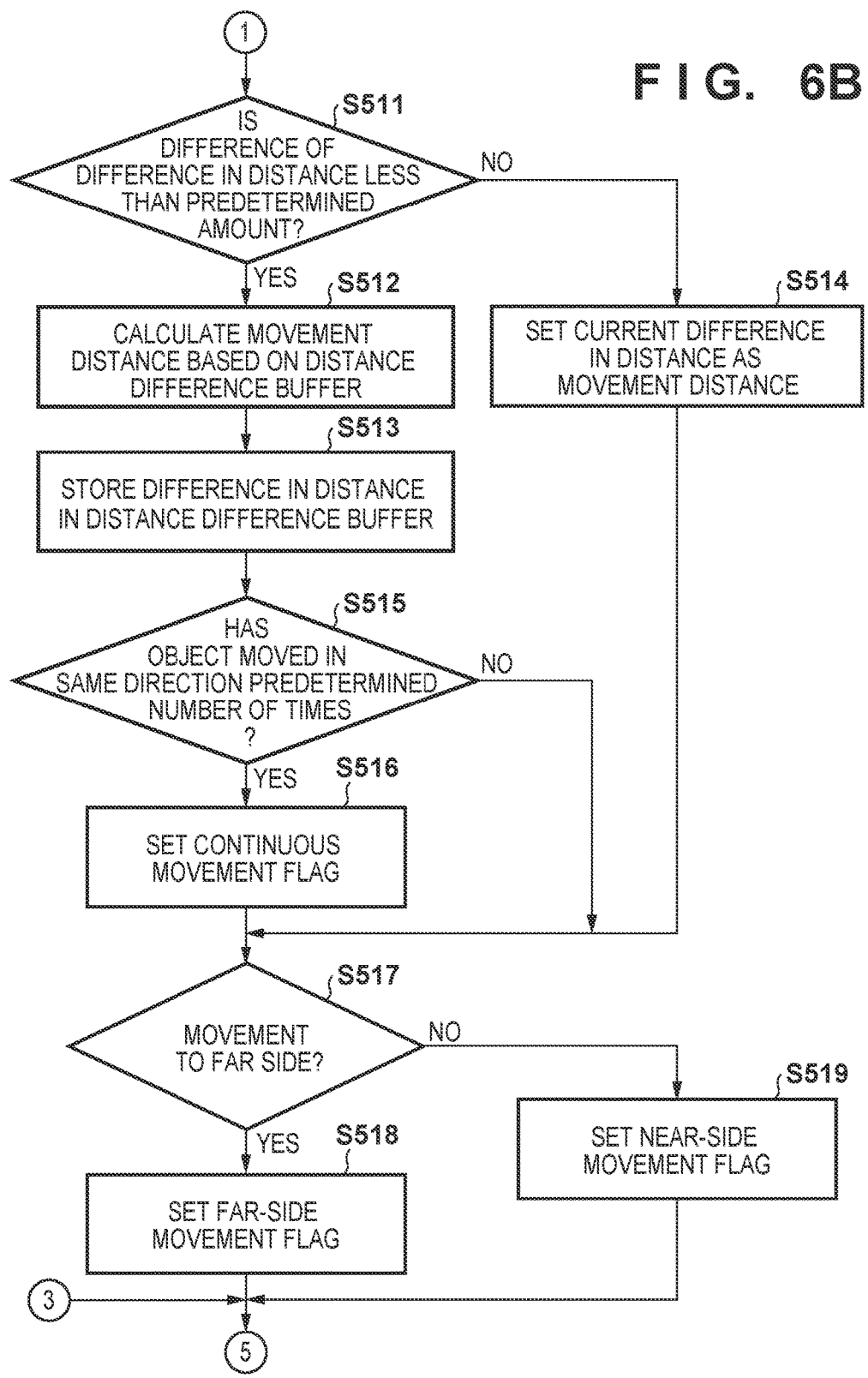
Figure 6C:
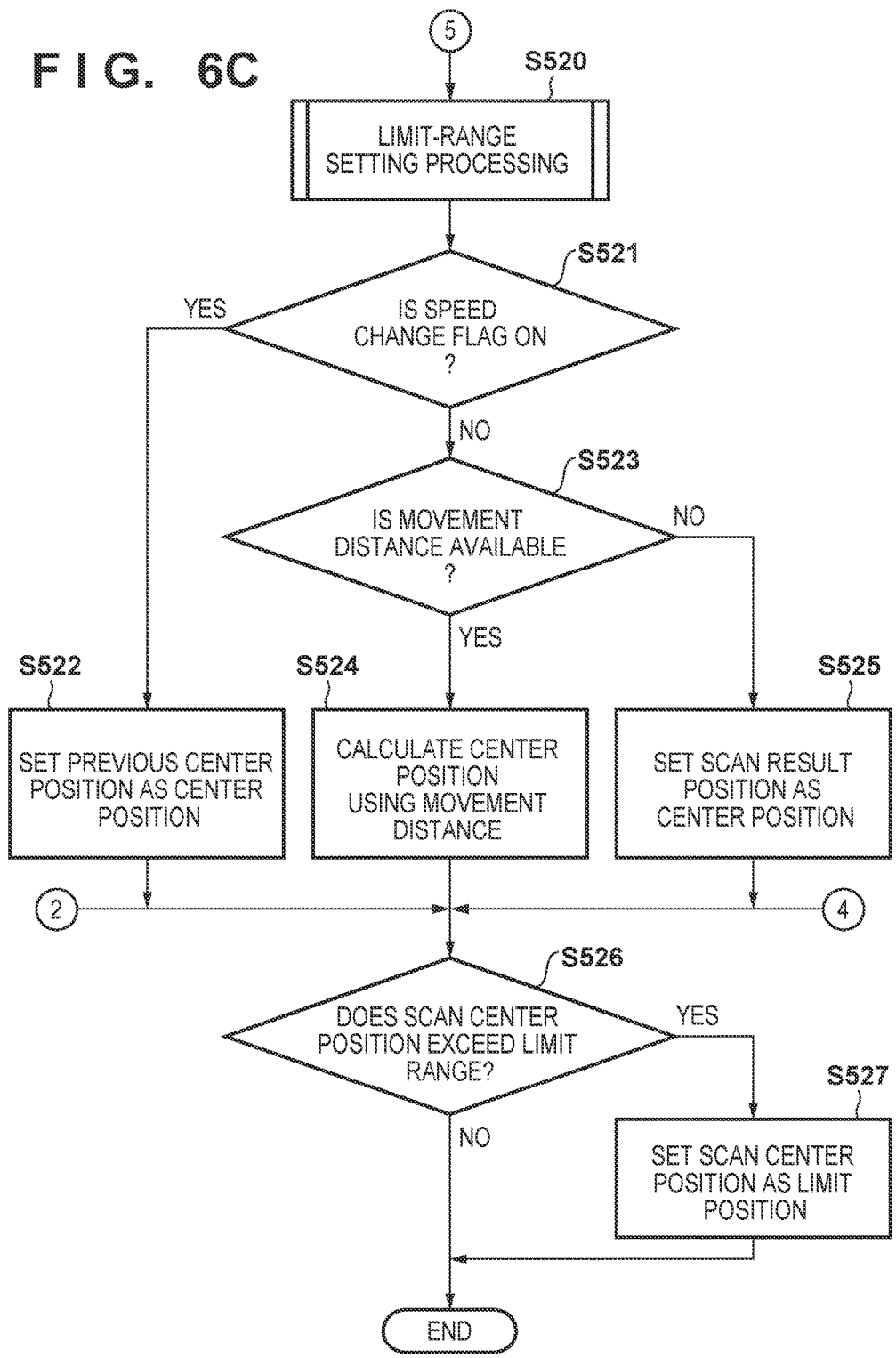

FIGS. 6A-6C are flowcharts illustrating a procedure of second or subsequent scan center position determination processing in step S304 of FIG. 3.

First, in step S501, whether or not the scan result shows an unfocused state is determined. "Unfocused state" refers to a state in which the AF evaluation value is low and does not include a peak. If it is determined that the scan result shows an unfocused state, in step S502, unfocused-state center position determination processing is performed. "Unfocused-state center position determination processing" will be described later with reference to FIG. 11. If it is determined that the scan result does not show the unfocused state, in step S503, a difference (hereinafter, referred to as "difference in position") between the focus lens position of the previous scan result and the focus lens position of the current scan result is calculated. Then, in step S504, whether or not the difference in position is less than a predetermined amount is determined. The determination is made because, if the difference in position is less than the predetermined amount, it is determined that the object is not moving, and no calculation for estimation while following the object is performed. In the present embodiment, the predetermined amount is set to the focus lens movement amount that corresponds to a depth of ±1.

If, in step S504, it is determined that the difference in position is less than the predetermined amount, in step S505, calculation of the scan center position that is performed when the difference in position is less than the predetermined amount is performed to determine the scan center position. The center position calculation in the present embodiment is performed such that in-focus positions when the difference in position is less than the predetermined amount are stored, and an average thereof is obtained.

If, in step S504, it is determined that the difference in position is equal to or larger than the predetermined amount, then in step S506, a current difference in distance and a previous difference in distance are compared. "Difference in distance" refers to a difference (previous difference in distance) between the object distance at a previous in-focus position and the object distance at an in-focus position obtained before the previous one, and to a difference (current difference in distance) between the object distance at the previous in-focus position and the object distance at a current in-focus position. Note that the object distance is obtained by detecting the position of the focus lens 104 at the in-focus position, and calculating the distance that corresponds to this focus lens position using the above-described focus cam data. Assuming that a difference in distance is calculated by (the object distance at the previous in-focus position)−(the object distance at the current in-focus position), it is possible to determine that the object is approaching if the difference in distance is a positive value, whereas the object is moving away if the difference in distance is a negative value. Also, it is possible to determine that the object is moving in the same direction as the previous direction if the sign indicating the difference in distance (hereinafter, referred to as "difference in distance") has not changed between the previous difference and the current difference, whereas the object has moved in an opposite direction if the sign is changed.

If, in step S506, it is determined that the object has moved in an opposite direction, in step S507, the current difference in distance is set as a movement distance, and a distance difference buffer is cleared. "Distance difference buffer" refers to a region in which differences in distance in a range of a predetermined amount are accumulated. By averaging the values stored in the buffer, it is possible to suppress the movement distances from varying. In the present embodiment, the predetermined amount is set to double or half of the movement distance that is calculated by averaging the values stored in the distance difference buffer. In other words, if a current distance is larger than the double of the movement distance or less than the half thereof, the current distance is stored in the distance buffer.

If, in step S506, it is determined that the object has moved in the same direction, in step S508, whether or not the difference in distance is stored in the distance difference buffer is determined. If the difference in distance is not stored in the distance difference buffer, in step S509, the current difference in distance is stored in the distance difference buffer, and is set as a movement distance. If the difference in distance is stored in the distance difference buffer, in step S511, whether or not a difference between the previous difference in distance and the current difference in distance is less than a predetermined amount is determined. If the difference is less than the predetermined amount, it is possible to determine that the object is moving at a constant speed, whereas if the difference is equal to or larger than the predetermined amount, it is possible to determine that the speed at which the object is moving has changed. In the present embodiment, as described above, the predetermined amount is set to double or half of the movement distance that is calculated based on the differences stored in the distance difference buffer. If it is determined that the difference (variation) between the previous difference in distance and the current difference in distance is less than the predetermined amount, the movement distance is calculated based on the differences stored in the distance difference buffer in step S512, and the difference in distance is stored in the distance difference buffer in step S513. If it is determined that the difference between the previous difference in distance and the current difference in distance is equal to or larger than the predetermined amount, in step S514, the current difference in distance is set as the movement distance, and the distance difference buffer is cleared.

Then, in step S515, whether or not the object has moved in the same direction a predetermined number of times while maintaining the difference in distance within a predetermined range is determined. With the determination, it is possible to determine whether or not the object is moving at a constant speed. If it is determined that the object has moved in the same direction a predetermined number of times, a continuous movement flag is set in step S516. In the present embodiment, the predetermined number of times is set to 2.

Then, in step S517, whether the object is moving to the far side, that is, is moving away, or is moving to the near side, that is, is approaching, is determined based on the difference in distance. If it is determined that the object is moving to the far side, a far-side movement flag is set in step S518. If it is determined that the object is moving to the near side, a near-side movement flag is set in step S519.

Then, in step S520, limit-range setting processing is performed. The processing will be described later with reference to FIGS. 10A and 10B. Then, in step S521, whether or not a speed change flag is ON is determined. The speed change flag is a flag that is set in the limit-range setting processing, and shows a state that indicates whether or not the moving speed of the object has changed based on the shape expressed by the AF evaluation values. If, in step S521, it is determined that the speed change flag is ON, the previous scan center position is set as the current scan center position in step S522.

Then, in step S523, whether or not the movement distance is available is determined. The case where the movement distance is available refers to a case where the scan result has two or more successive peaks of the AF evaluation values in the scan range, and the distance information was correctly obtained. If it is determined that the movement distance is available, in step S524, the movement distance is used to calculate the current scan center position.

A method for calculating a scan center position using the movement distance will be described with reference to FIG. 7. FIG. 7 shows object distances in scans that are performed at every 125 msec when the object is moving at a constant speed of 10 km/hour. Since the movement distance was obtained (350 mm in the present embodiment), the formula: current distance (3150 mm)−movement distance (350 mm)=next estimated distance (2800 mm) is satisfied. The focus lens position that corresponds to the next estimated distance is obtained based on the cam data, and the obtained focus lens position is set as the scan center position. If it is determined that the movement distance is not available, in step S525, the focus lens position that was determined as a peak in the current scan is set as the center position. Then, in step S526, whether or not the set scan center position exceeds the limit range set in step S520 is determined. If the set scan center position exceeds the limit range (the set scan center position is distanced by a predetermined value or more), the scan center position is set as the position at an end of the limit range (is limited within a range of a predetermined depth) in step S527, and the procedure ends. If the set scan center position does not exceed the limit range, the scan center position that was set in previous processing is set as the scan center position, and the procedure ends.

FIG. 8 shows a case where the focus lens position that corresponds to the estimated distance does not exceed the limit range. In this case, the position of a circle serves as the scan center position. FIG. 9 shows a case where the focus lens position that corresponds to the estimated distance exceeds the limit range. In this case, the position that has advanced from the current distance by a depth of 20, that is, the position at 9 serves as the scan center position.

FIGS. 10A and 10B are flowcharts illustrating a procedure of the limit-range setting processing in step S520 of FIG. 6C.

First, in step S601, whether or not the AF evaluation value shows a near-side continuous increase is determined. If it is determined that the AF evaluation value shows a near-side continuous increase, in step S602, whether or not the object is moving to the near side is determined. The determination as to whether or not the object is moving to the near side is performed using a difference in distance. If, in step S602, it is determined that the object is moving to the near side, in step S603, whether or not the near-side movement flag is ON is determined. By checking the flag, it is possible to determine whether or not the object is continuously moving to the near side. If it is determined that the near-side movement flag is ON, then in step S604, the limit range is set to the maximum range. In the present embodiment, a region of a depth of ±40 from the current in-focus position is set as the maximum range. If, in step S603, it is determined that the near-side movement flag is OFF, the limit range is set to an enlarged range. In the present embodiment, a region of a depth of ±30 from the current in-focus position is set as the enlarged range. If, in step S602, it is determined that the object is not moving to the near side, this means that the AF evaluation value is likely to increase on the near side even when the object has moved to the far side, and thus it is possible to determine that the speed has changed. In this case, in step S606, the speed change flag is set, and in step S607, the limit range is set to a normal range. In the present embodiment, a region of a depth of ±20 from the current in-focus position is set as the normal range.

If, in step S601, it is determined that the AF evaluation value does not show a near-side continuous increase, then, in step S608, whether or not the AF evaluation value shows the far-side continuous increase is determined. If it is determined that the AF evaluation value shows a far-side continuous increase, in step S609, whether or not the object is moving to the far side is determined. The determination as to whether or not the object is moving to the far side is performed using the difference in distance. If, in step S609, it is determined that the object is moving to the far side, in step S610, whether or not the far-side movement flag is ON is determined. By checking the flag, it is possible to determine whether or not the object is continuously moving to the far side. If the far-side movement flag is ON, then in step S611, the limit range is set to the maximum range. If, in step S610, it is determined that the far-side movement flag is OFF, the limit range is set to the enlarged range. If, in step S609, it is determined that the object is not moving to the far side, this means that the AF evaluation value is likely to increase on the far side even when the object has moved to the near side, and thus it is possible to determine that the speed has changed. In this case, the speed change flag is set in step S613, and the limit range is set to the normal range in step S614. If, in step S608, the AF evaluation value does not show a far-side continuous increase, in step S615, whether or not the continuous movement flag is ON is determined. If it is determined that the continuous movement flag is ON, in step S616, the limit range is set to the maximum range. If it is determined that the continuous movement flag is not ON, the limit range is set to the normal range in step S617, and the procedure ends.

FIG. 11 is a flowchart illustrating a procedure of the unfocused-state center position determination processing in step S502 of FIG. 6A.

First, in step S501, the scan width is set to the unfocused-state scan width. Then, in step S702, whether or not the AF evaluation value shows a near-side continuous increase is determined. "Near-side continuous increase" in this context refers to a state in which the AF evaluation value is low, and the AF evaluation value obtained as a result of the scanning is likely to continue to increase on a near side end of the scan range, and has not changed to decrease. If it is determined that the AF evaluation value is likely to increase on the near side, in step S703, the scan center position is set at a position that is displaced from the previous center position to the near side by a predetermined amount in the direction in which focusing is performed. In the present embodiment, this predetermined amount is set to a depth of 30. If, in step S702, it is determined that the result does not show a near-side continuous increase, then in step S704, whether or not the result shows a far-side continuous increase is determined. "Far-side continuous increase" in this context refers to a state in which the AF evaluation value is low, and the AF evaluation value obtained as a result of scanning is likely to continue to increase at a far side end of the scan range, and has not changed to decrease. If it is determined that the AF evaluation value is likely to increase on the far side, in step S705, the scan center position is set at a position that is displaced from the previous center position to the far side by a predetermined amount in the direction in which focusing is performed. In the present embodiment, this predetermined amount is set to a depth of 30.

With this measure, even if the current scan range is set at a position that is distanced from an object, it is possible to correct the scan range based on the tendency of AF evaluation values. If, in step S704, it is determined that the result does not show a far-side continuous increase, the current scan center position is set as the scan center position in step S706, and the procedure ends.

As described above, according to the procedures of FIGS. 3, 5, 6, 10, and 11, it is possible to continuously focus on an object without using complex calculation even when the object is moving at a near distance.

The present invention has described so far with reference to the embodiment, but the present invention is not limited to the above-described embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-030266, filed Feb. 19, 2016, which is incorporated by reference herein in its entirety.

What is claimed is:

1. An image capturing apparatus comprising:
a detection unit configured to detect in-focus positions by moving a focus lens of an imaging optical system along an optical axis in a predetermined range to acquire a focus evaluation value that is based on an image contrast;
a storage unit in which focus cam data is stored that indicates a relationship between an object distance and a focus lens position that corresponds to the object distance;
a calculation unit configured to calculate object distances at the in-focus positions that were obtained in the in-focus position detection continuously performed by the detection unit, based on focus lens positions at the in-focus positions and the focus cam data;
an estimation unit configured to estimate an object distance in next in-focus position detection, based on a difference between the object distances at the in-focus positions that were calculated by the calculation unit; and
a determination unit configured to determine a predetermined range in which the focus lens is moved in the next in-focus position detection, based on an estimated value for the object distance in the next in-focus position detection that was estimated by the estimation unit.

2. The image capturing apparatus according to claim 1, wherein a center position of the predetermined range in the next in-focus position detection is limited to a position within a range of a predetermined depth, if a focus lens position that corresponds to the estimated value for the object distance that was estimated by the estimation unit is distanced from a focus lens position in previous in-focus position detection by a predetermined value or more.

3. The image capturing apparatus according to claim 1, wherein a displacement amount of the center position of the predetermined range in the next in-focus position detection is made to be larger in a case where the focus evaluation value in current in-focus position detection is the largest at an end of the predetermined range than in a case where the focus evaluation value is not the largest at the end of the predetermined range.

4. The image capturing apparatus according to claim 3, wherein, if an incline of a change curve of the focus evaluation value with respect to the focus lens position in the current in-focus position detection is less than a predetermined incline at the end of the predetermined range, the displacement amount of the center position of the predetermined range in the next in-focus position detection is set to a first amount that is larger than that in a case where the focus evaluation value is not the largest at the end of the predetermined range.

5. The image capturing apparatus according to claim 4, wherein, if the incline of the change curve of the focus evaluation value with respect to the focus lens position in the current in-focus position detection is equal to or greater than the predetermined incline at the end of the predetermined range, the displacement amount of the center position of the predetermined range in the next in-focus position detection is set to a second amount that is smaller than the first amount.

6. The image capturing apparatus according to claim 1, wherein, if it is determined that a change in the difference between the object distances at the in-focus positions is within a predetermined range, the estimation unit sets a difference between an object distance at a previous in-focus position and an object distance at a current in-focus position to a difference between the object distance at the current in-focus position and an object distance at a next in-focus position, and calculates an estimated value for the object distance at the time of the next in-focus position detection.

7. The image capturing apparatus according to claim 1, wherein the estimation unit does not calculate an estimated value for the object distance at the time of the next in-focus position detection if, in the continuously performed in-focus position detection, a difference between the in-focus positions is less than a predetermined amount.

8. The image capturing apparatus according to claim 1, wherein the predetermined range in the next in-focus position detection is set to be larger if it is determined that no object is in focus in the current in-focus position detection.

9. A method for controlling an image capturing apparatus that is provided with a storage unit in which focus cam data is stored that indicates a relationship between an object distance and a focus lens position that corresponds to the object distance, the method comprising:
detecting in-focus positions by moving a focus lens along an optical axis in a predetermined range to acquire a focus evaluation value that is based on an image contrast;
calculating object distances at the in-focus positions that were obtained in the in-focus position detection continuously performed in the detecting, based on focus lens positions at the in-focus positions and the focus cam data;
estimating an object distance in next in-focus position detection, based on a difference between the object distances at the in-focus positions that were calculated in the calculating; and
determining a predetermined range in which the focus lens is moved in the next in-focus position detection, based on an estimated value for the object distance in the next in-focus position detection that was estimated in the estimating.

10. A non-transitory computer-readable storage medium storing a program for causing a computer to execute a method for controlling an image capturing apparatus that is provided with a storage unit in which focus cam data is stored that indicates a relationship between an object distance and a focus lens position that corresponds to the object distance, the method comprising:
detecting in-focus positions by moving a focus lens along an optical axis in a predetermined range to acquire a focus evaluation value that is based on an image contrast;
calculating object distances at the in-focus positions that were obtained in the in-focus position detection continuously performed in the detecting, based on focus lens positions at the in-focus positions and the focus cam data;

estimating an object distance in next in-focus position detection, based on a difference between the object distances at the in-focus positions that were calculated in the calculating; and determining a predetermined range in which the focus lens is moved in the next in-focus position detection, based on an estimated value for the object distance in the next in-focus position detection that was estimated in the estimating.

* * * * *